US012167094B2

(12) United States Patent
Bradley et al.

(10) Patent No.: US 12,167,094 B2
(45) Date of Patent: Dec. 10, 2024

(54) INTELLIGENT MEDIA CONTENT PLAYBACK

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/662,028

(22) Filed: May 4, 2022

(65) Prior Publication Data

US 2023/0362446 A1    Nov. 9, 2023

(51) Int. Cl.
*H04N 21/472* (2011.01)
*G06V 20/40* (2022.01)
*H04N 21/485* (2011.01)

(52) U.S. Cl.
CPC ....... *H04N 21/47217* (2013.01); *G06V 20/46* (2022.01); *G06V 20/48* (2022.01); *H04N 21/4852* (2013.01)

(58) Field of Classification Search
CPC ......... H04N 21/47217; H04N 21/4852; G06V 20/46; G06V 20/48
See application file for complete search history.

(56) References Cited

U.S. PATENT DOCUMENTS

| | | | |
|---|---|---|---|
| 2007/0168864 A1* | 7/2007 | Yamamoto | G06F 16/739 707/E17.026 |
| 2014/0321831 A1* | 10/2014 | Olsen | H04N 21/475 386/280 |
| 2015/0213840 A1* | 7/2015 | Innami | G11B 27/34 386/243 |
| 2016/0225405 A1* | 8/2016 | Matias | G06F 16/78 |
| 2018/0341705 A1* | 11/2018 | Kim | G06F 16/3341 |
| 2019/0028780 A1* | 1/2019 | Prabhu | H04N 21/8547 |
| 2020/0382834 A1* | 12/2020 | Gupta | H04N 21/47202 |

* cited by examiner

*Primary Examiner* — Girumsew Wendmagegn
(74) *Attorney, Agent, or Firm* — Guntin & Gust, PLC; Dana B. LeMoine

(57) ABSTRACT

The disclosed technology is directed towards creating a media content presentation for playback, based on user specified input criteria and playback instructions. A user specifies input criteria related to media source data. The media source data is accessed, and further based on the input criterion, matching segments (e.g., scenes and audio) are determined from metadata information that describes the segments; the media playback content is generated from the matching segments. A user may also specify criteria/instructions that describe how to play the matching segments, such as in linear order, or based on relative relevance such as scene impactfulness. A matching scene can be repeated, and/or augmented with annotation data. For any matching scene or transition between two matching scenes, specified playback speed and audio volume can be specified and applied. As part of generation, the media content presentation can be fit to a specified time constraint.

20 Claims, 11 Drawing Sheets

INTELLIGENT MEDIA CONTENT PLAYBACK

TECHNICAL FIELD

The subject application relates to the presentation of media in general, and more particularly to playing back media content based on user-selected criteria, and related embodiments.

BACKGROUND

Contemporary users of media are often not particularly interested in experiencing (or re-experiencing) certain parts of media content. Instead, as users play back (e.g., from a file) or stream prerecorded media content, they often attempt to fast forward to the next desired portion, play that portion, again fast forward to the next desired portion, and so on. This manual interaction can be time consuming, can be awkward at times (e.g., advance too far and have to rewind), and otherwise provide a less-than-desirable experience (e.g., take too long to complete the overall experience and have to resume at another time).

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
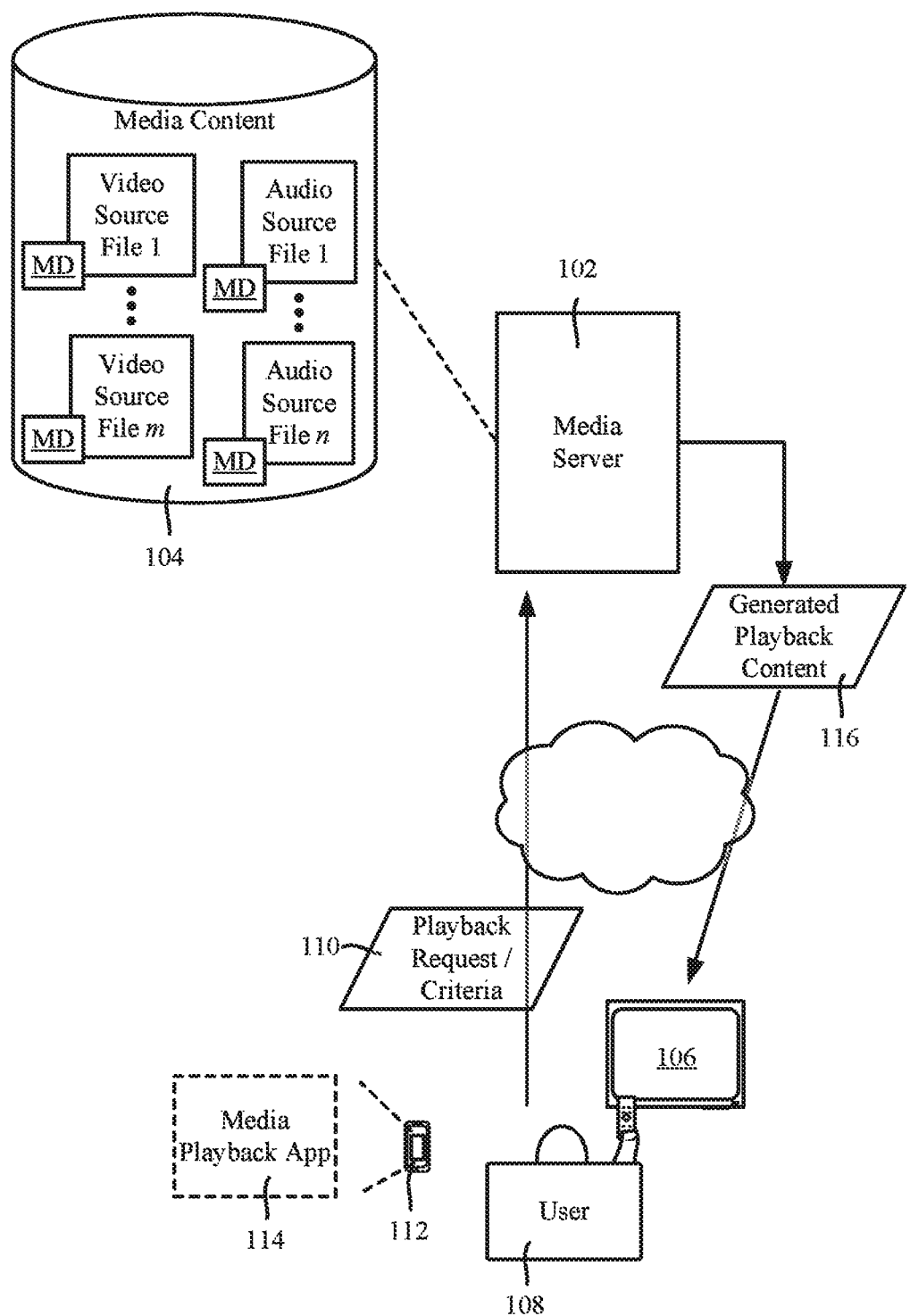
FIG. 1 is a block diagram of an example system for generating a media content presentation from source data based on specified criteria, in accordance with various aspects and embodiments of the subject disclosure.

The technology described herein is generally directed towards intelligently playing back media to a user based on user-specified criteria. The intelligent media playback allows a user to obtain a desired playback experience by specifying criteria describing the content in general, and how the playback is to occur based on matching the criteria to metadata that describes the content. For instance, the user may want to be presented with certain parts of the media content, and have it be presented in a linear (chronologically, but not the entire content) or non-linear and/or non-chronological way; a user may desire certain portions to be presented in a modified manner, such as in fast-forward, slow motion, or with modifications, such as to the visual or audio presentation.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a media server 102 that provides primary media content from a suitable media content data store 108 to a media presentation device 106 of a user 108. The media content may include, but is not limited to, audio, video, graphics, images, extended reality content, virtual reality content, augmented reality content, gaming content, Internet browsing content, and/or other digital media that can be presented to the user. The media content may be created as a file that can be downloaded to the user's devices, or may be streamed, without necessarily being a complete file. The media content may be provided by the media server 102, such as retrieved on request of the user, e.g., on demand or on some schedule.

In general, the user sends playback request criteria 110 to the media server 102 (or some service coupled thereto). The user can specify the desired content via general criteria, such as "2019 World Series game 6" content, as well as more specific content, such as "home runs." The requested media content can be even more specific, e.g., "home runs by the Braves," "the sword-fighting scenes" in an action move or television show, and so forth. Other non-limiting examples are set forth herein, and, for example, can be chosen in any way, including via a search request, via interaction with a graphical user interface (e.g., menu selection), or other means such as a spoken request or a gesture-based request. In any case, the playback request/criteria 110 is created and sent to the media server 102. Some criteria can be specified by default and saved, such as preset by a user (or another user or process) so as to automatically generate certain highlights (e.g., scoring plays and goalie saves) for later playback after (or during) every soccer game that the Barcelona football club plays. Any saved default criteria can be overridden, such as used as a basis for another presentation with some modified criteria, and so forth.

The media server 102 uses the specified criteria 110 to locate the content in general, and match the criteria 110 to metadata associated with each file (or other data structure) of prerecorded content. In this way, the relevant parts (e.g., segments, such as including video scenes and accompanying audio) of media content can be determined, and used to create a media content presentation according to the user's criteria and other instructions (e.g., fast forward some part), as described below. Note that in the example of FIG. 1, video source files 1-file m and audio source files 1-file n are shown as maintained on the media content data store 104 and can each include the metadata describing each file and/or subpart therein. Alternatively, the metadata can be separately maintained and associated with the source files. As shown in FIG. 1, the included and/or associated metadata is labeled "MD" for each depicted source file.

Metadata is thus established that can provide time demarcations and descriptions of scenes of the media content, e.g., in any appropriate format, such as timestamps and text. For example, video-related metadata may be defined by timestamps such that the scene descriptions have a beginning and ending point in time. These scene demarcations may be used in concert with media playback requests in order to determine how to create the formatted media for playback. Therefore, a complete media source file may be segmented into scenes with metadata for use in determining the presentation of the playback.

As shown in FIG. 1, the user 108 may be equipped with a communication device 112 such as a smart phone. The communication device may be equipped with a media playback application program (app) 114. The communication device may alternatively be integrated with or connected to the media display device, such as a Smart TV or an auxiliary device that provides smart media capabilities, such as apps. The media server 102 with access to the media content thus may be engaged by the user 108 to stream media to the media display. Regardless of on which device or type of device the media playback app is operating, the user may use the media playback app 114 to formulate and send the playback request/criteria 110.

Upon receiving the playback request, the media server 102 searches for one or more source files that may be used to compile the playback content 116 (e.g., file) to be generated (created). The one or more source files of media content may be stored in different locations and they may be of different formats. For instance, one of the source files used may be a video file and another may be an audio file, although it is feasible for a source file to contain both video and audio. One source can be the "official" recorded broadcast version, while another source can be a version recorded by an attendee of the live event, and so on. In any event, the resulting playback file 116 created by the media server 102 may contain scenes or segments from a single file, or from different source files including different types of source files.

Once the one or more source files are identified, e.g., by generally descriptive title or the like "World Series Game 6" "or today's Cubs game", the media server 102, analyzes the metadata associated with the segments/scenes for each of the one or more source files. The metadata is used to match the requirements of the playback request, for instance, to search for all of the home run scenes and accompanying audio in the source file(s) for the specified baseball game. The identified scenes are subsequently used in the creation of the playback file. The playback file may contain only the identified scenes to be used or, alternatively, the playback file may contain the complete one or more source files.

Figure 2:
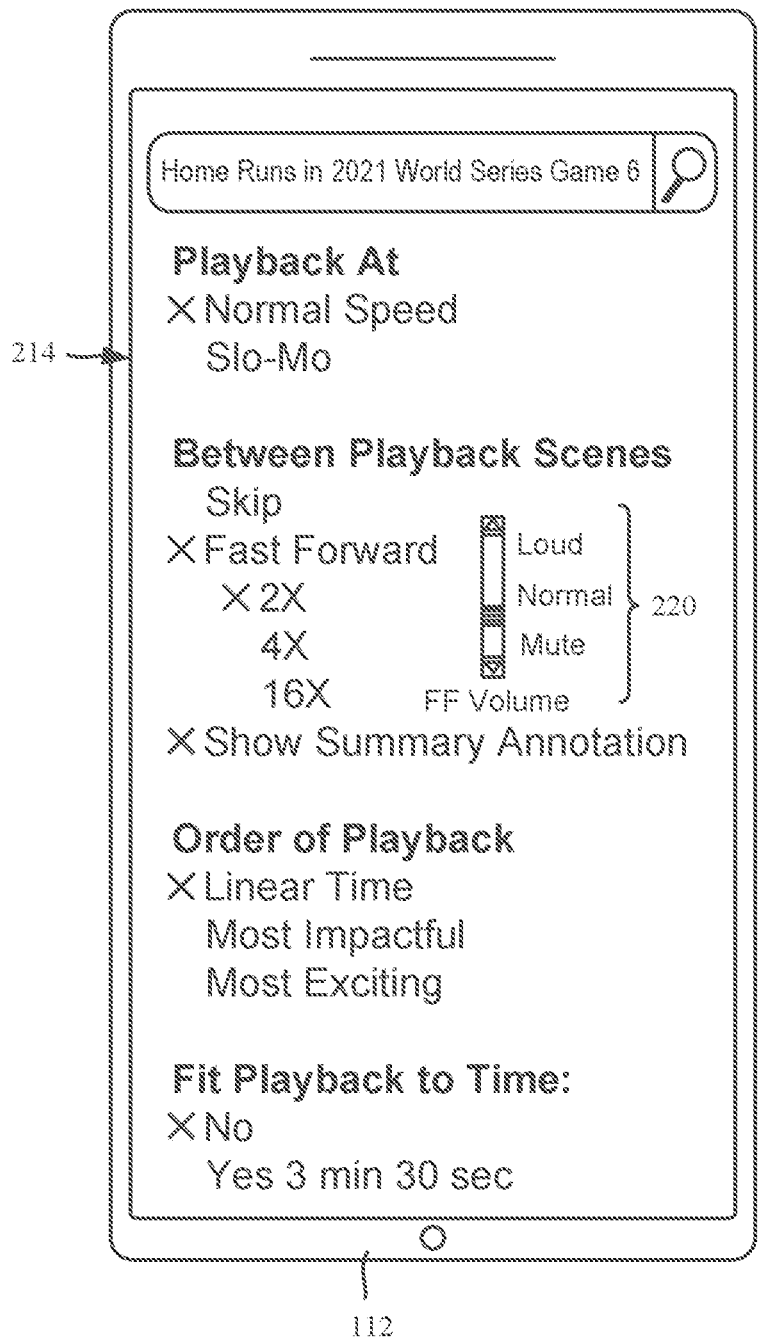
FIG. 2 is an example representation of a user interface that allows a user to specify playback criteria/instructions, in accordance with various aspects and embodiments of the subject disclosure.

After the scenes or segments of the source files have been identified for inclusion in the playback file, additional playback request criteria (e.g., possibly including instructions) from the user are used to determine how to format the presentation of the playback file. For instance, as generally shown in FIG. 2 via the example user interface 214 (of the app 114) displayed on the device 112, the user may have specified playback speed and other formatting specifications for the playback in the initial request or via subsequent communication(s). Any segments requested to be played at normal speed or slow motion, as specified by the request, are saved at that playback speed in their portion of the playback file. That is, the playback file may contain some scenes at normal speed and others at fast forward or slow motion speeds. (When the playback content 114 is ultimately played, these variations are presented.)

Additionally, as represented by the slider control 220, the user may have requested an adjustment in volume level; for instance, audio for fast-forwarded material may be played back but at a lower volume level, possibly muted. As set forth herein, the scenes used may be from a single source file or from multiple source files, including using mostly-identical scenes from different sources, e.g., the American version and the Canadian version of the same Super Bowl play. The user may also request that certain criteria be used to identify scenes that are played back in a format for emphasis. For instance, some scenes may be played back at normal speed, while others are played back in slow motion or twice consecutively for emphasis. Split screen, side-by-side (possibly different sizes), picture-in-picture and the like are also options.

Note that it is alternatively feasible for the media server to return only single speed/non-specially formatted content but provide accompanying playback instructional data (e.g., when playing scene Z, play at double speed) to the user's playback device or some intermediate device (e.g., the smartphone) that controls presentation, such that when ultimately presented, playback speed, formatting and so forth are automatically applied during the playback.

Thus, FIG. 2 shows some of the possible instructions and/or criteria that the user can specify with respect to the playback. In addition to speed, what to do between scenes can be selected, such as skip any intervening content, or play but at a faster speed. Order of time can also be specified, such as linear time, or ordered by impact (such as previously judged, determined via voting, determined by artificial intelligence (AI), or the like), and stored as a per-scene score in the metadata. Data such as a tied or very close score, in a later inning, can be used to determine the impact level of a home run, for example. "Most exciting" can be similarly pre-determined and maintained as a per-scene score in the metadata, including for example based on crowd noise (cheering, booing or near-silence when a visiting team did well, and so forth).

To summarize, the playback file created may order the segments that are presented in an order that is non-chronological. Specifications from the request from the user are used to determine if there is a desire for this nonlinear presentation of the segments. For example, the user may request that the scenes be played back in an order of priority based on other criteria, such as which scenes are the most impactful, the most exciting, the funniest, or other. Data that is indicative of each scene's ability to fulfill these criteria may be included with the metadata for each scene. These metadata may be assigned to each scene in any suitable way, including using AI techniques and/or an analysis of the source media file, or by other means (e.g., social media postings during the actual live time of the scenes). Thus, each scene in a source file may be assigned a score for its level of excitement, humor, impactfulness, or other attribute.

Further, the user may also specify a time constraint for the playback file so as to provide the media server with criteria for how to select or otherwise modify the segments to fit the specified time constraint. This may tie in directly with the user's chosen order of playback, e.g., play the most exciting scenes in a four minute timeframe, but also can be independent of the playback order. For example, the media content presentation can be extended, compressed, clipped, sped up and so forth to meet a time constraint. If too long a time is specified, e.g., ten minutes but there was only one home run in some selected game's home run(s) to present, then play the home run multiple times, from different camera angles, with different audio feeds (home team's announcers and visiting team's announcers), replay some of the scene(s) in slow motion, and so on. Conversely, if not sufficient time, then speed up one or more scenes, clip one or more scene (show the home run being hit but not the batter running the entire four bases) and so on.

Figure 3:
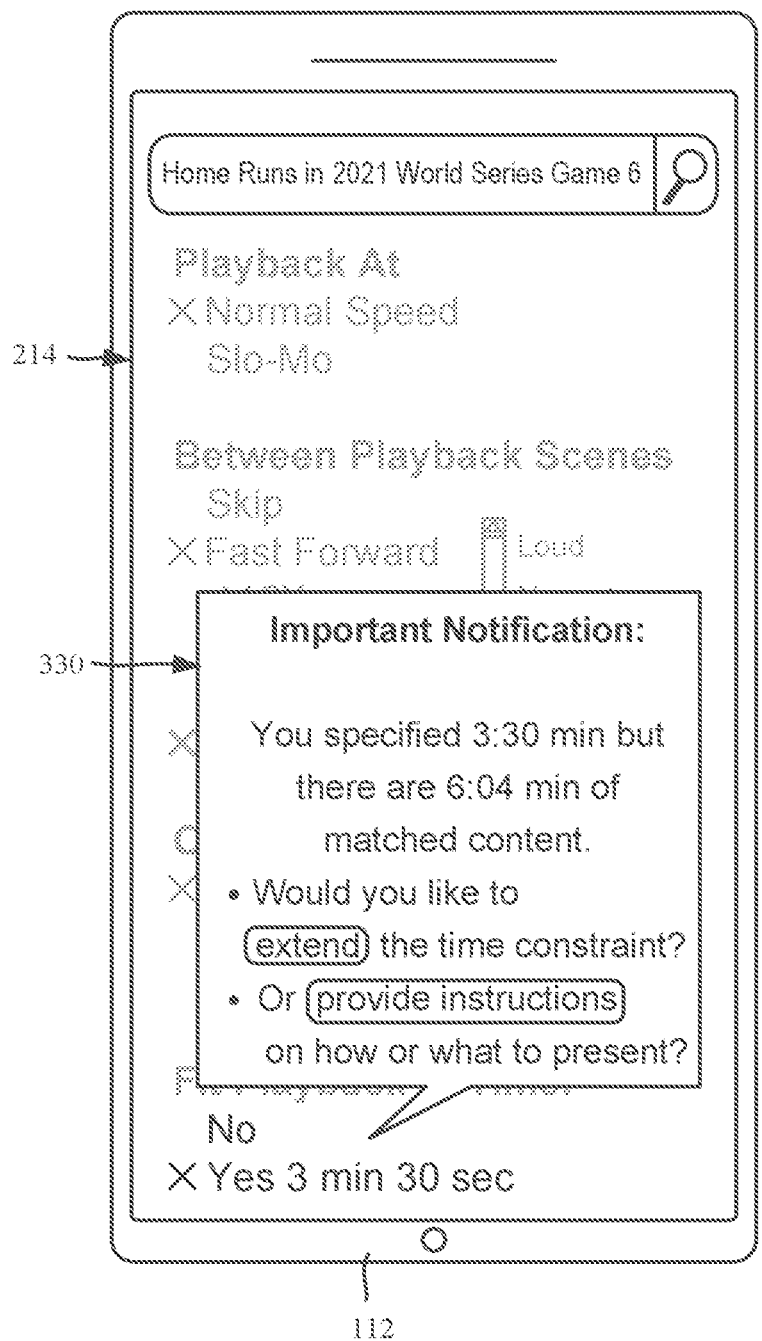
FIG. 3 is an example representation of an interactive user interface that notifies a user with respect to resolving time constraint issues, in accordance with various aspects and embodiments of the subject disclosure.

User preference data can be used to determine what to do in such a time misfit situation. Such preference data can be by default, pre-specified by the user or obtained via subsequent notification and interaction with the user. For example, as shown in the example of FIG. 3, the server (or the app 114 once obtained from the server) can respond with a notification 330 indicating something like, "You specified 3 min 30 sec but there are 6:04 min of matched content. Would you like to extend the time constraint? Or provide instructions on how or what to present?" or the like. The user can interact to extend the time, or interact to choose to provide instructions, and (possibly) receive or be taken by the app to an interactive menu, wizard or the like that obtains the user preference data as to what to play (or deselect) and how to play it (speed up at points, show one team's home runs only, and so on). Although not explicitly shown, it is feasible for a user to select (or have preselected by default) that the server should make its best guess, or use impact scores, use excitement level scores and so on to make the decision on behalf of the user as to how to fit the time constraint.

Figure 4:
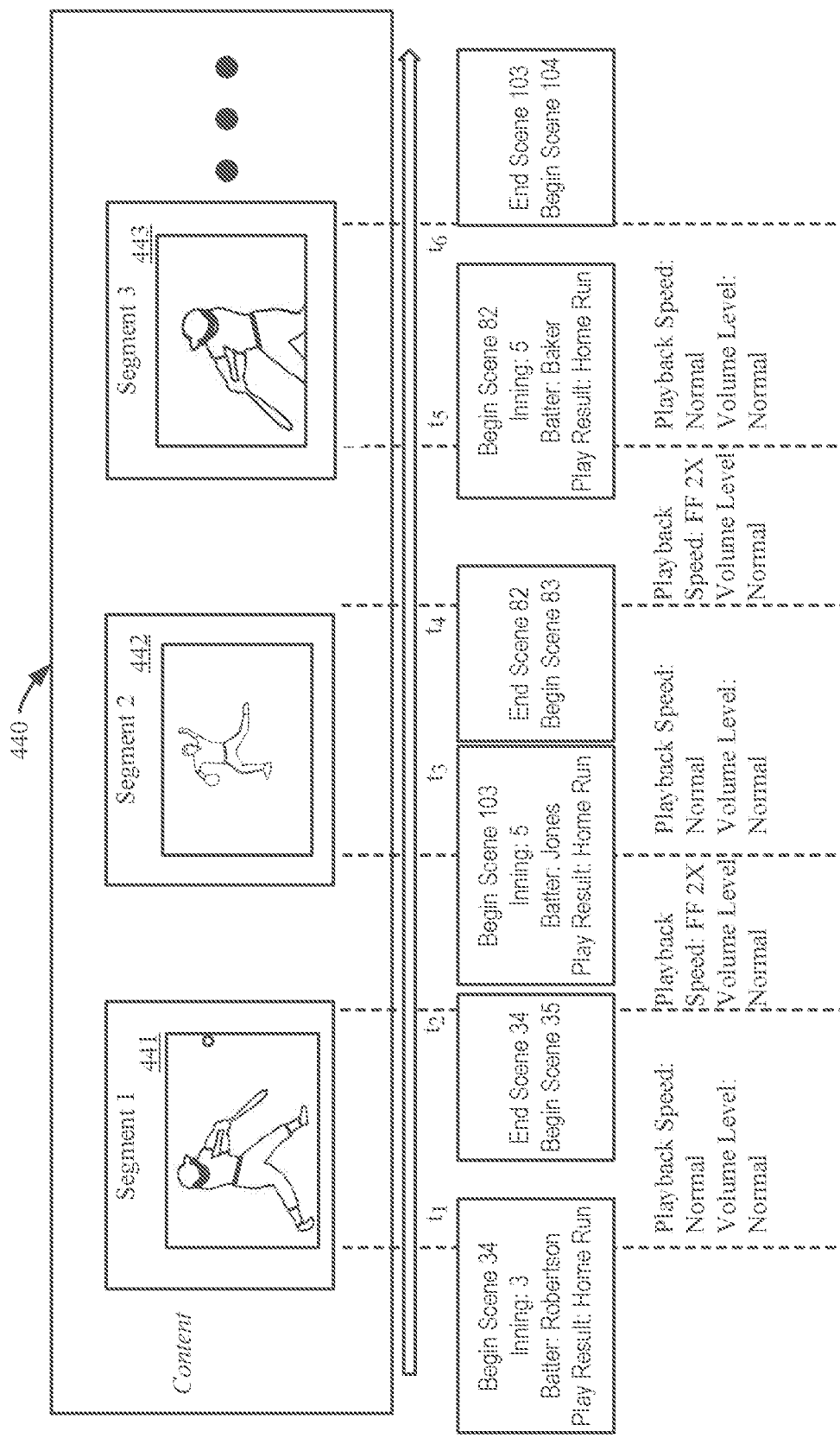
FIG. 4 is an example representation of a generated media content presentation, along with example metadata and playback instructions, that can be played back (e.g., via downloading or streaming), in accordance with various aspects and embodiments of the subject disclosure.

FIG. 4 shows an example, generalized representation of how a media content presentation 440 can be generated and streamed or otherwise downloaded for presentation. As can be seen, the segments 441-443 include respective scene identifier data (e.g., scene 34 to 35 for segment 441) which alternatively or in addition can be time offset and/or duration data (e.g., starting at forty-one minutes and eight seconds, though forty-one minutes and thirty seconds, or starting at forty-one minutes and eight seconds for a twenty-two second duration). Other context metadata (e.g., inning for a baseball game, possibly outs, runners on base, current score at the time) and/or result data (home run) can be available, such as for searching as well as providing context to the user).

Also represented in FIG. 4 is playback speed and volume level data for each scene. Note that although not explicitly shown in FIG. 2 or 4, it is feasible to have different speeds for different scenes, such as based on per-scene input provided by the user once the scenes have been matched. That is, once the scenes are selected by the criteria, FIG. 2 or the like can be used to provide per-scene and per-scene transition instructions. Thus, one scene can be played at normal speed, and a next scene in slow motion. One scene can directly skip to a next scene, while another can, after playing, fast forward to its subsequent scene. Although not explicitly shown, audio volume for a scene need not be only settable for fast forward/slow motion scenes, as, for example, audio volume can be adjusted for any scene, such as increased for emphasis of a particularly impactful scene. Thus, the user can act as an editor to some extent, such as to assist at a reasonably granular level in creating the presentation, such as to consume at some later time or by another person; an example may be a child's first birthday video to be viewed again when the child is older.

It is also feasible for the user to interact as the generated media content is being presented. For example, a user may have requested to see the home runs in some game, but may decide during the presentation to replay a particular one, or fast forward through a different one.

Figure 5:
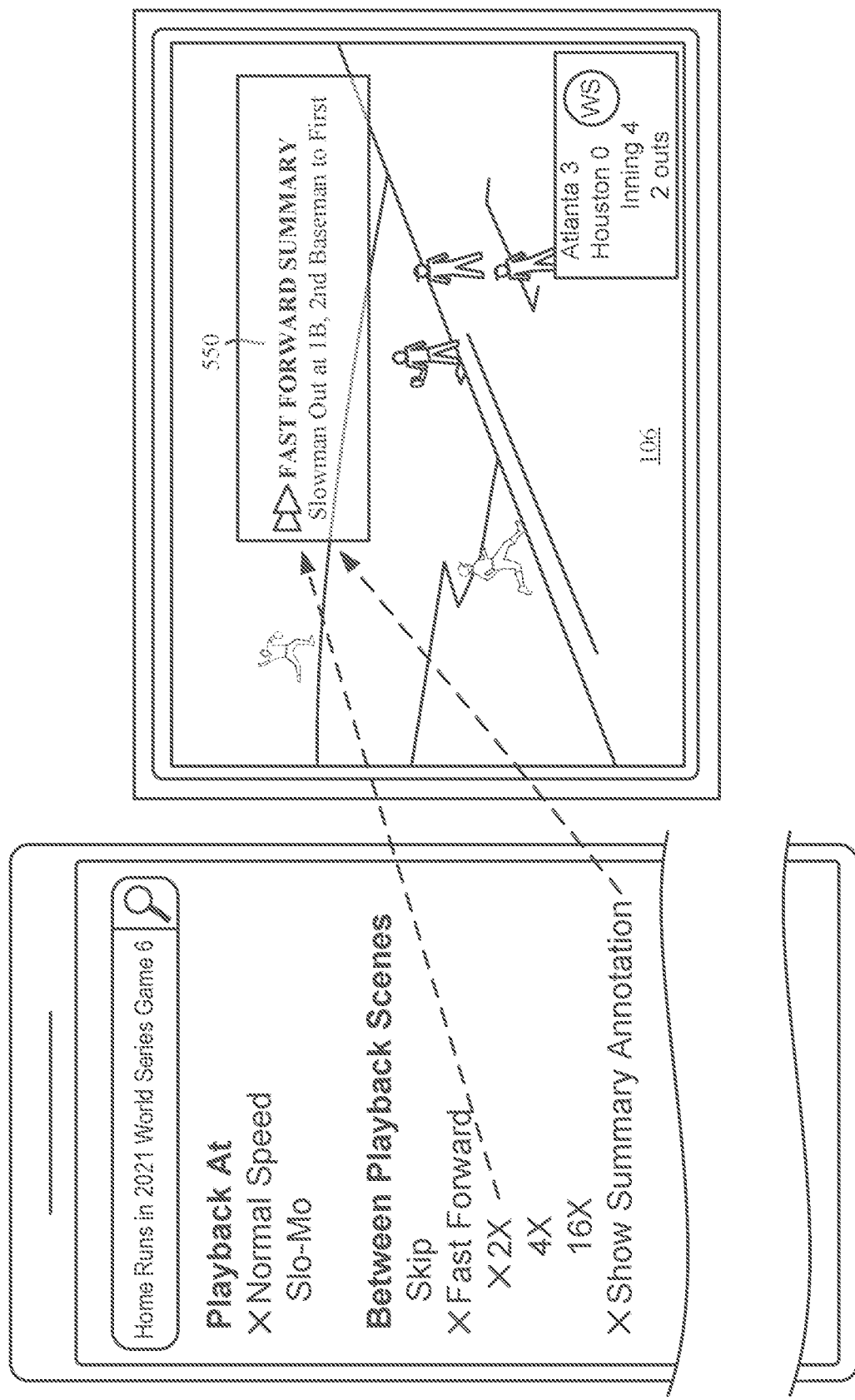
FIG. 5 is an example representation of a generated media content presentation augmented with annotation data, in accordance with various aspects and embodiments of the subject disclosure.

As shown in FIG. 5, if specified by the user, the creation of the playback file may also include summary annotation data 5550 (e.g., obtained from the metadata or a supplementary source) that are displayed during selected segments, e.g., any fast-forwarded segments. The summary annotations may be created from the metadata that describes the scenes. For instance, scenes that are of less interest may still be viewed, but at a fast forward speed with an annotated summary of that scene displayed to describe the scene while it is played back at the fast forward speed. Note that summary annotation data need not be limited to fast-forwarded segments, but can be output for any segment, including slow motion and normal speed segments. Summary annotation data can also be future, such as here is what will happen in this half-inning.

Figure 6:
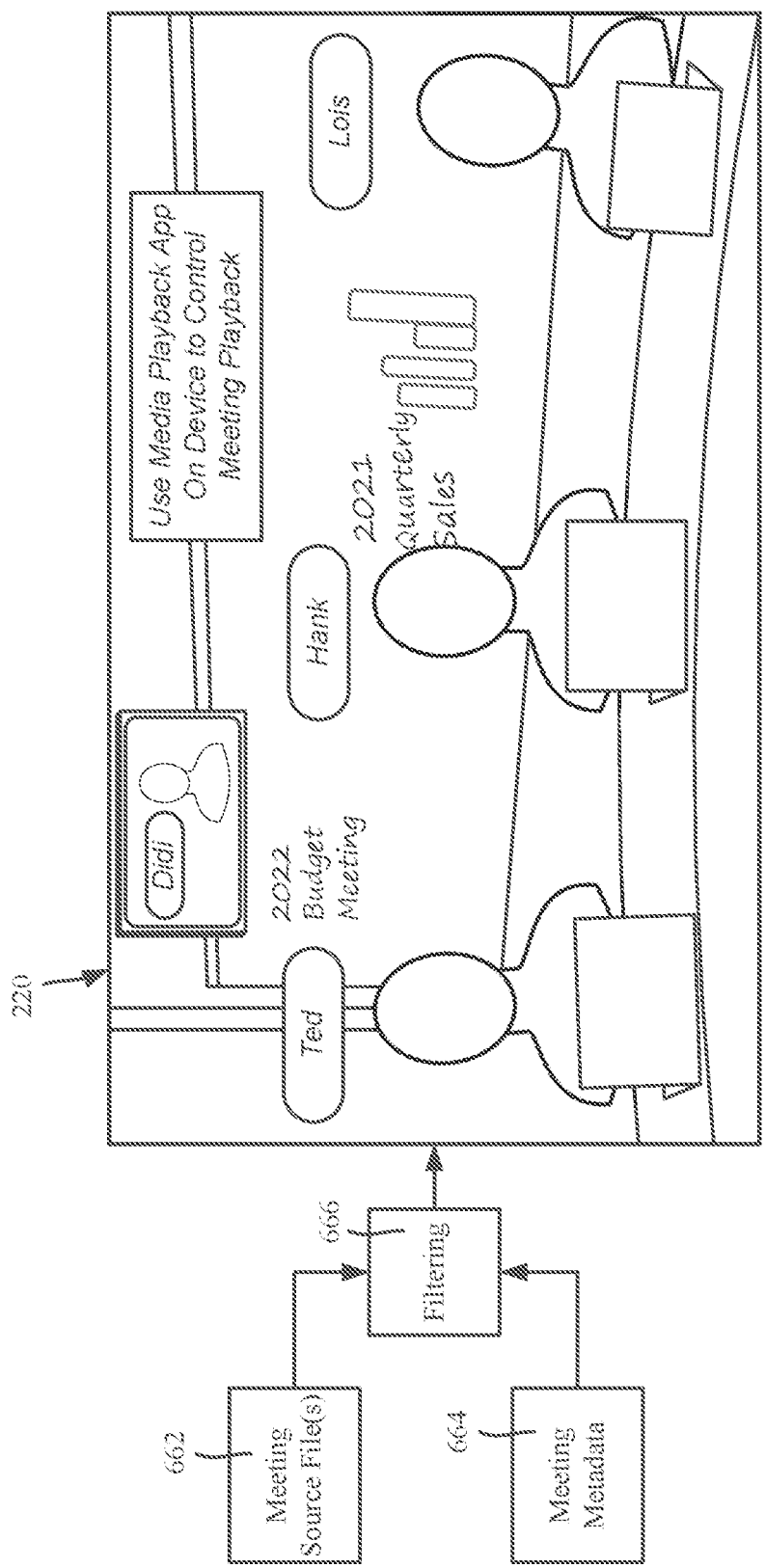
FIG. 6 is an example representation of a media content presentation generated from source meeting file(s), in accordance with various aspects and embodiments of the subject disclosure.

As set forth herein, the technology described herein may be applied to other types of media and other types of content. For example, as depicted in FIG. 6, a video 660 of a meeting, or a capture of a virtual reality meeting may serve as a source file. The user may create a request for playback using other types of search criteria relevant to the type of content. For instance, for a meeting video, a user may search for all scenes in which she spoke, all scenes in which Ted and Hank are having a conversation, all action items assigned to that user, or any number of different types of search that may be represented and matched using the metadata that describes the contents of each scene.

As also shown in FIG. 6, the technology described herein may be used to create a "Meaningful Content" playback file, which, based on the meeting source file(s) 662 and meeting metadata 664, includes only the productive content from a meeting. The "small talk" or other superfluous content, as identified by AI or the like, may be filtered out by the AI (block 666), that is, filtered out content can be skipped/sped past or the like. Such filtered out content instead, or also, can be otherwise handled, such as to show an image with overlaid text summarizing what was filtered out, which can be displayed for a brief time, or until the user requests moving on.

Any playback file that is created may be saved for future consumption by the user or others. The file that is created may be saved with the criteria used to create it. In this manner, a later consumption of the playback file may be done in a manner so as the user understands the original request criteria that were used to generate the playback file.

Figure 7:
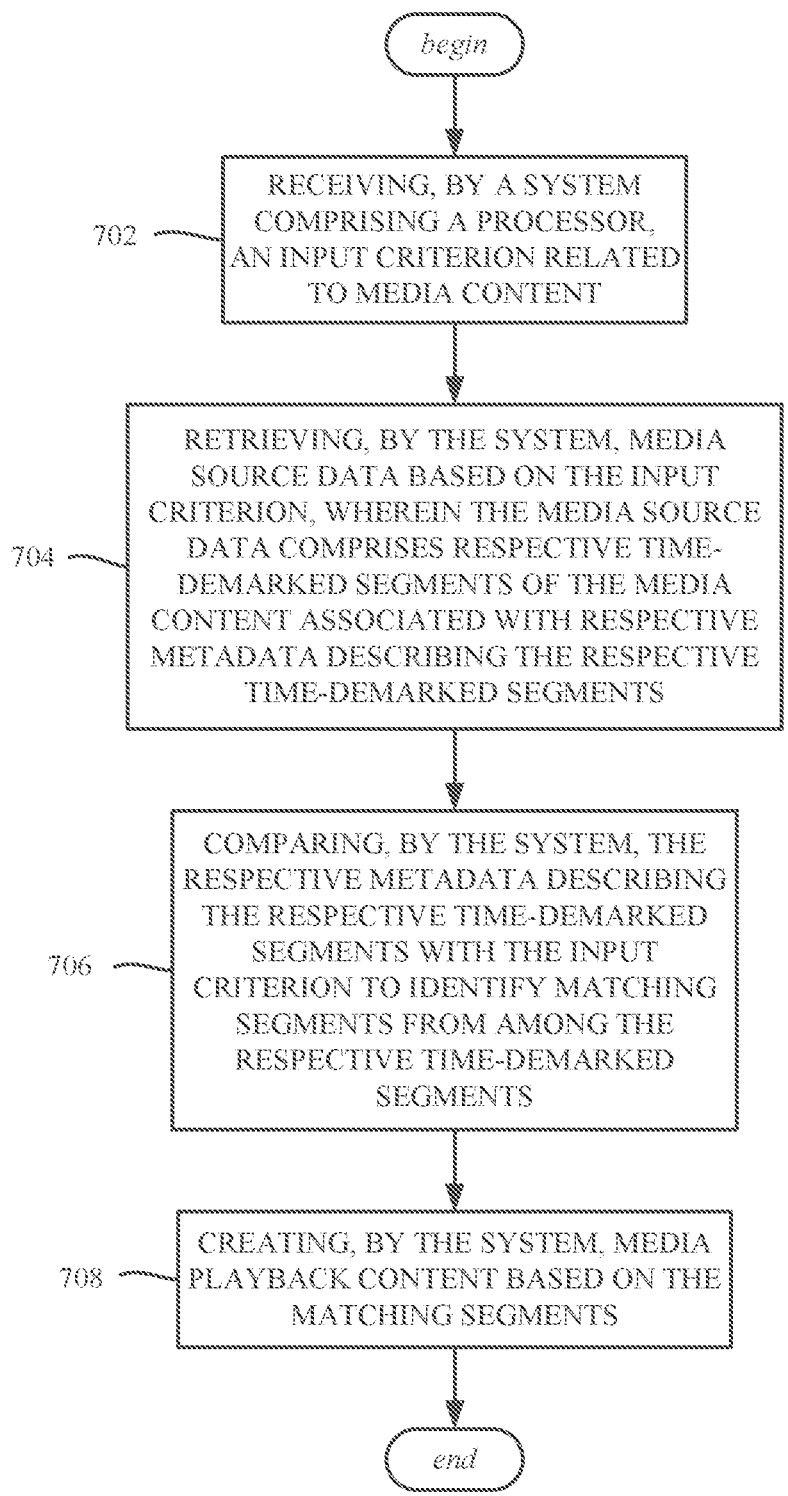
FIG. 7 is a flow diagram representing example operations related to creating media playback content based on matching segment metadata to specified criteria, in accordance with various aspects and embodiments of the subject disclosure.

One or more example aspects are represented in FIG. 7, and, for example, can correspond to operations, such as of a method. Example operation 702 represents receiving, by a system comprising a processor, an input criterion related to media content. Example operation 704 represents retrieving, by the system, media source data based on the input criterion, wherein the media source data can include respective time-demarked segments of the media content associated with respective metadata describing the respective time-demarked segments. Example operation 706 represents comparing, by the system, the respective metadata describing the respective time-demarked segments with the input criterion to identify matching segments from among the respective time-demarked segments. Example operation 708 represents creating, by the system, media playback content based on the matching segments.

Receiving the input criterion can include receiving a search request comprising the input criterion.

The matching segments can include matching scenes, and further operations can include receiving, by the system, instructions for presentation of a first matching scene of the matching scenes at a first playback speed that differs from a second playback speed of a second matching scene of the matching scenes.

The matching segments can include a first matching scene and a second matching scene; the first matching scene can be associated with first accompanying audio content, the second matching scene can be associated with second accompanying audio content, and further operations can include receiving, by the system, instructions for output, in conjunction with playback of the first scene, of the first accompanying audio content at a first playback volume level that differs from a second playback volume level of the second accompanying audio content for output in conjunction with playback of the second scene.

Creating the media playback content can include fitting the media playback content to an input-specified time constraint.

Further operations can include presenting, by the system to an output device, the media playback content. Presenting the media playback content can include presenting annotation data of a respective matching segment based on the respective metadata of the respective matching segment.

Further operations can include receiving, by the system, playback order instructions for presentation a first matching scene of the matching scenes before presenting a second matching scene.

Further operations can include receiving, by the system, transition instructions for a transition from presenting a first matching scene of the matching scenes to presenting a second matching scene of the matching scenes.

Figure 8:
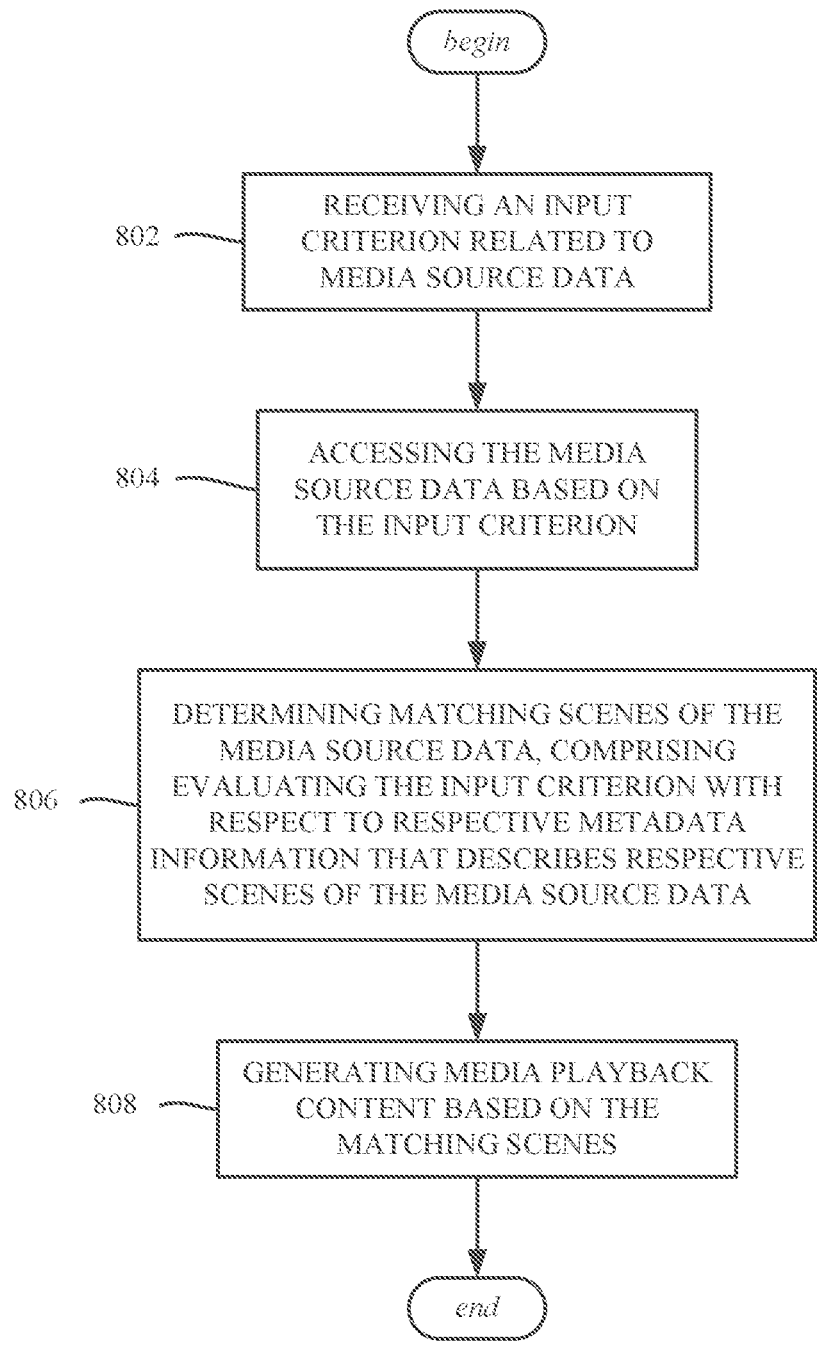
FIG. 8 is a flow diagram representing example operations related to locating and generating media playback content based on matching scene metadata to specified criteria, in accordance with various aspects and embodiments of the subject disclosure.

One or more example aspects are represented in FIG. 8, and can correspond to a system, including a processor, and a memory that stores executable instructions that, when executed by the processor, facilitate performance of operations. Example operation 802 represents receiving an input criterion related to media source data. Example operation 804 represents accessing the media source data based on the input criterion. Example operation 806 represents determining matching scenes of the media source data, comprising evaluating the input criterion with respect to respective metadata information that describes respective scenes of the media source data. Example operation 808 represents generating media playback content based on the matching scenes.

Further operations can include outputting the media playback content to a display device.

Further operations can include receiving ordering instructions usable to present the matching scenes in a specified order, and wherein the operations further can include outputting the media playback content in the specified order.

The matching scenes can include a first matching scene and a second matching scene, the first matching scene can be associated with first accompanying audio content, the second matching scene can be associated with second accompanying audio content, and further operations can include receiving volume instructions usable to output the first accompanying audio content at a first playback volume level that differs from a second playback volume level of the second accompanying audio content, usable to output the first matching scene to a display device, usable to output, in conjunction with outputting the first matching scene, the first accompanying audio content at the first playback volume level to an audio device, usable to output the second matching scene to the display device, and usable to output, in conjunction with outputting the second matching scene, the second accompanying audio content at the second playback volume level to the audio device.

Generating the media playback content can include fitting the media playback content to an input-specified time constraint.

Further operations can include presenting annotation data of a respective matching segment based on the respective metadata of the respective matching segment.

The matching scenes can include a first matching scene and a second matching scene, the first matching scene can be associated with first accompanying annotation data, the second matching scene can be associated with second accompanying annotation data, and further operations can include outputting the first annotation data to a display device, and outputting the second annotation data to the display device.

Further operations can include outputting the first matching scene to the display device in conjunction with the outputting the first annotation data to the display device.

Figure 9:
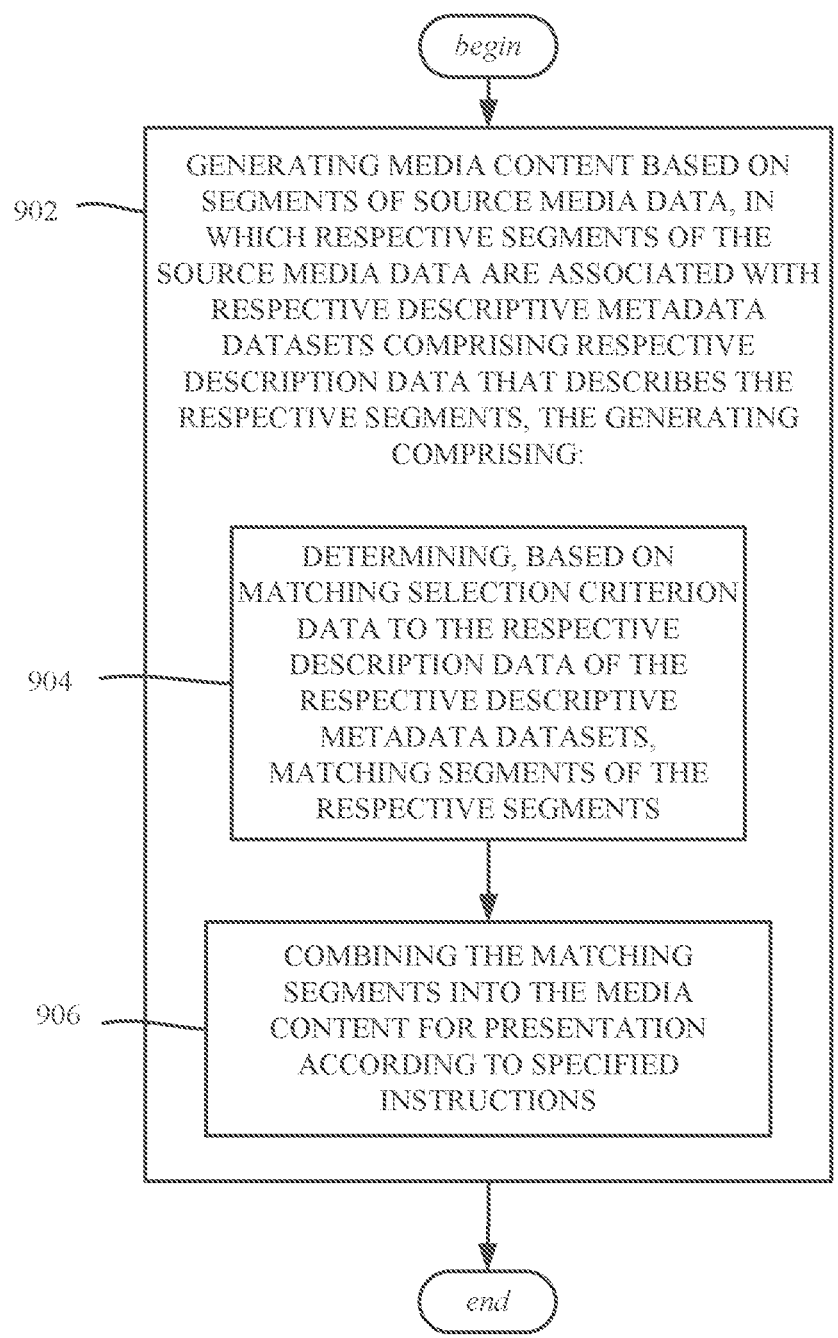
FIG. 9 is a flow diagram representing example operations related to determining matching segments based on scene metadata and selection criterion, and combining the segments into media content for presentation, in accordance with various aspects and embodiments of the subject disclosure.

One or more aspects are represented in FIG. 9, such as implemented in a machine-readable medium, including executable instructions that, when executed by a processor, facilitate performance of operations. Example operation 902 represents generating media content based on segments of source media data, in which respective segments of the source media data are associated with respective descriptive metadata datasets comprising respective description data that describes the respective segments. The generating can include determining, based on matching selection criterion data to the respective description data of the respective descriptive metadata datasets, matching segments of the respective segment (operation 904), and combining the matching segments into the media content for presentation according to specified instructions (operation 906).

Combining the matching segments into the media content for presentation according to the specified instructions can include configuring the matching segments for playback based on at least one of: presentation order data for presenting the matching segments in a playback order determined via the presentation order data, playback speed data for presenting at least one matching segment at a playback speed determined via the playback speed data, transition data for transitioning from playback of a first matching segment to playback of a second matching segment based on the transition data, volume data for presenting a first matching segment in conjunction with audio accompanying the first matching segment at a first volume level based on the volume data, or annotation data for presenting a first matching segment with first annotated data based on a first descriptive metadata dataset associated with the first matching segment or annotation data for presenting a first matching segment with first annotated data based on a first descriptive metadata dataset associated with the first matching segment.

Generating the media content can include fitting the matching segments to a playback time based on time-constraint data, the fitting comprising at least one of: deselecting at least one of the matching segments, clipping at least one of the matching segments, configuring at least part of at least one of the matching segments for playback more than once, speeding up playback of at least one of the matching segments, slowing down playback of at least one of the matching segments, or extending playback of at least one of the matching segments with supplementary content for playback.

As can be seen, the technology described herein facilitates generation of a media content presentation that is relevant to a user based on user-specified criteria. The media content presentation can, for example, efficiently provide a user with a media consumption (e.g., viewing) experience without significant user interaction, or indeed any user interaction, once the media content presentation has been generated and playback is started.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 10:
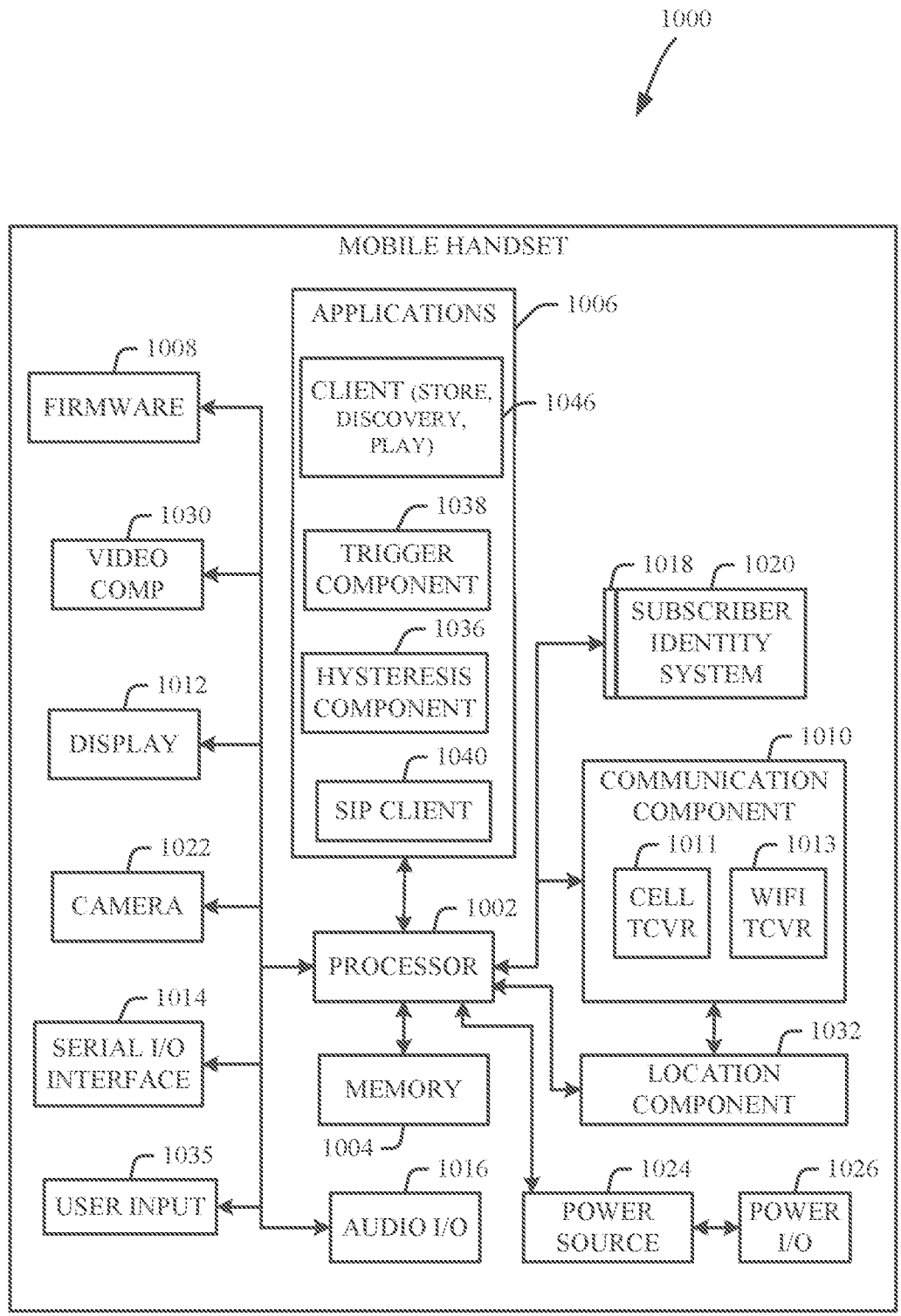
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device (such as user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
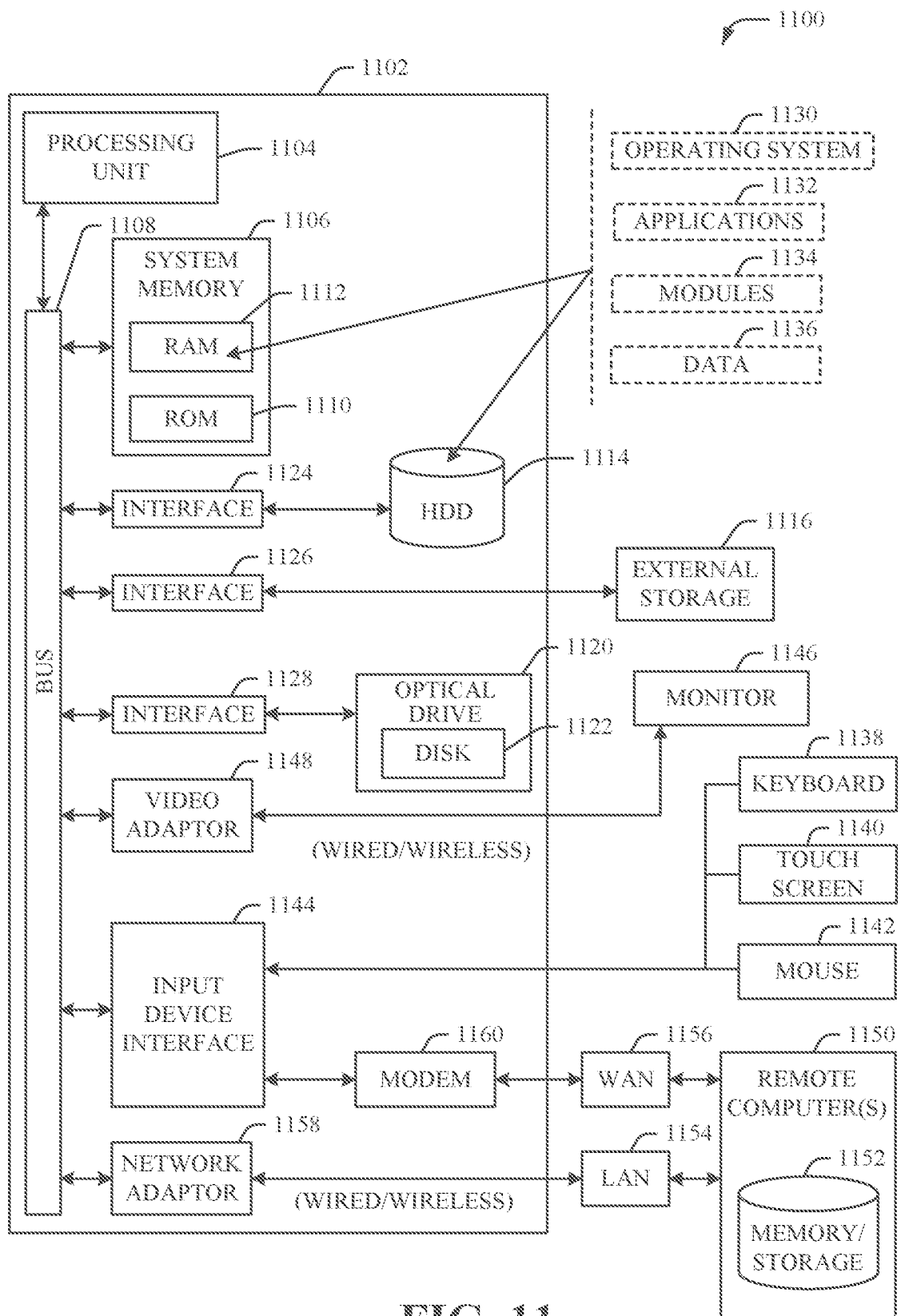
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or framebased flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
receiving, by a processing system comprising a processor, from a mobile device, an input criterion related to media content, the input criterion including an input-specified time constraint;
retrieving, by the processing system, media source data based on the input criterion, wherein the media source data comprises respective time-demarked segments of the media content associated with respective metadata describing the respective time-demarked segments, and wherein the media source data includes broadcast media source data and a user-generated media source data recorded by an attendee at a live event;
comparing, by the processing system, the respective metadata describing the respective time-demarked segments with the input criterion to identify matching segments from among the respective time-demarked segments in the broadcast media source data and user-generated media source data;
creating, by the processing system, media playback content based on the matching segments, wherein the matching segments comprise a first matching scene from the broadcast media source data and a second matching scene from the user-generated media source data;
receiving, by the processing system, instructions for presentation of the first matching scene at a first playback speed that differs from a second playback speed of the second matching scene, wherein the first playback speed is determined at least in part in response to crowd noise in the first matching scene;
determining that the input-specified time constraint is longer than a time to playback the first matching scene and the second matching scene;
in response to the determining, modifying the media playback content to play the second matching scene more than once with different audio feeds; and
providing the media playback content to a media display device, wherein the media display device is different from the mobile device.

2. The method of claim 1, wherein receiving the input criterion comprises receiving a search request comprising the input criterion.

3. The method of claim 1, wherein presentation of the media playback content is modified based on a user request during the presentation.

4. The method of claim 1, wherein the first matching scene is associated with first accompanying audio content, wherein the second matching scene is associated with second accompanying audio content, and further comprising receiving, by the processing system, instructions for output, in conjunction with playback of the first matching scene, of the first accompanying audio content at a first playback volume level that differs from a second playback volume level of the second accompanying audio content for output in conjunction with playback of the second matching scene.

5. The method of claim 1, wherein the input-specified time constraint is specified by a default value provided by the mobile device.

6. The method of claim 1, further comprising presenting, by the processing system to the mobile device, the media playback content.

7. The method of claim 6, wherein presenting the media playback content comprises presenting annotation data of the first matching scene and the second matching scene based on the respective metadata of the respective first matching scene and second matching scene.

8. The method of claim 1, further comprising receiving, by the processing system, playback order instructions for presentation of the first matching scene of the matching scenes before presenting the second matching scene.

9. The method of claim 1, further comprising receiving, by the processing system, transition instructions for a transition from presenting the first matching scene to presenting the second matching scene.

10. A system, comprising:
a processing system including a processor; and
a memory that stores executable instructions that, when executed by the processing system, facilitate performance of operations, the operations comprising:
receiving, from a mobile device, an input criterion related to media source data, the input criterion including an input-specified time constraint;
accessing the media source data based on the input criterion, wherein the media source data includes broadcast media source data and a user-generated media source data recorded by an attendee at a live event;
determining matching scenes of the media source data, comprising evaluating the input criterion with respect to respective metadata information that describes respective scenes of the media source data, the matching scenes including a first matching scene of the broadcast media source data and a second matching scene of the user-generated media source data;
generating media playback content based on the matching scenes; and
receiving instructions for presentation of the first matching scene of the matching scenes at a first playback speed that differs from a second playback speed of the second matching scene of the matching scenes, wherein the first playback speed is determined at least in part on crowd noise in the first matching scene;
determining that the input-specified time constraint is longer than a time to playback the first matching scene and the second matching scene;
in response to the determining that the input-specified time constraint is longer than a time to playback the first matching scene and the second matching scene, modifying the media playback content to play the second matching scene more than once with different audio feeds; and
providing the media playback content to a media display device, wherein the media display device is different from the mobile device.

11. The system of claim 10, wherein the operations further comprise outputting the media playback content to the mobile device.

12. The system of claim 10, wherein the operations further comprise receiving ordering instructions usable to present the matching scenes in a specified order, and wherein the operations further comprise outputting the media playback content in the specified order.

13. The system of claim 10, wherein the first matching scene is associated with first accompanying audio content, wherein the second matching scene is associated with second accompanying audio content, and wherein the operations further comprise receiving volume instructions usable to output the first accompanying audio content at a first playback volume level that differs from a second playback volume level of the second accompanying audio content, usable to output the first matching scene to the media display device, usable to output, in conjunction with outputting the first matching scene, the first accompanying audio content at the first playback volume level to an audio device, usable to output the second matching scene to the media display device, and usable to output, in conjunction with outputting the second matching scene, the second accompanying audio content at the second playback volume level to the audio device.

14. The system of claim 10, wherein the input-specified time constraint comprises a default value provided by the mobile device.

15. The system of claim 10, wherein the operations further comprise presenting annotation data of a respective matching segment based on the respective metadata of the respective matching segment.

16. The system of claim 10, wherein the first matching scene is associated with first accompanying annotation data, wherein the second matching scene is associated with second accompanying annotation data, and wherein the operations further comprise outputting the first accompanying annotation data to the mobile device, and outputting the second accompanying annotation data to the media display device.

17. The system of claim 16, wherein the operations further comprise outputting the first matching scene to the media display device in conjunction with the outputting the first accompanying annotation data to the mobile device.

18. A non-transitory machine-readable medium, comprising executable instructions that, when executed by a processing system including a processor, facilitate performance of operations, the operations comprising:
receiving an input criterion related to media content, the input criterion including an input-specified time constraint, matching selection criterion data, and playback instructions;
generating media content based on segments of first source media data including broadcast source media data and segments of second source media data including user-generated source media data, in which respective segments of the first source media data and second source media data are associated with respective descriptive metadata datasets comprising respective description data that describes the respective segments, the generating comprising:
determining, based on the matching selection criterion data to the respective description data of the respective descriptive metadata datasets, matching segments of the respective segments, the matching segments including a first matching segment from the broadcast source media data and a second matching segment from the user-generated source media data; and
combining the matching segments into the media content for presentation according to the playback instructions for presentation of the first matching segment of the matching segments at a first playback speed that differs from a second playback speed of the second matching segment of the matching segments, wherein the first playback speed is determined at least in part on crowd noise in the first matching segment, and wherein the second matching segment is duplicated with different audio feeds in the media content for presentation when a time to play the first matching segment and the second matching segment is less than the input-specified time constraint.

19. The non-transitory machine-readable medium of claim 18, wherein combining the matching segments into the media content for presentation according to the playback instructions comprises configuring the matching segments for playback based on at least one of: presentation order data for presenting the matching segments in a playback order determined via the presentation order data, playback speed data for presenting at least one matching segment at a playback speed determined via the playback speed data, transition data for transitioning from playback of the first matching segment to playback of the second matching segment based on the transition data, volume data for presenting the first matching segment in conjunction with audio accompanying the first matching segment at a first volume level based on the volume data, or annotation data for presenting the first matching segment with first annotated data based on a first descriptive metadata dataset associated with the first matching segment or annotation data for presenting the first matching segment with first annotated data based on a first descriptive metadata dataset associated with the first matching segment.

20. The non-transitory machine-readable medium of claim 18, wherein the operations further comprise modifying presentation of the media content based on a user request during the presentation.

\* \* \* \* \*